2,890,238
PREPARATION OF GLYCONITRILE

Arthur R. Sexton, Midland, Mich., assignor to The Dow Chemical Company, Midland, Mich., a corporation of Delaware No Drawing. Application January 31, 1957
Serial No. 637,369

4 Claims. (Cl. 260—465.6)

This invention relates to a process of preparing glyconitrile in aqueous medium.

Glyconitrile is a simple compound which is useful to form glycine by hydrolysis, or in syntheses where a hydroxy alkyl group or an β-hydroxy acyl group is needed. The preparation involves reaction of formaldehyde with hydrogen cyanide to form the glyconitrile. Glycine may be synthesized by passing anhydrous hydrogen cyanide into aqueous formaldehyde to form the glyconitrile at temperature in the range from 30 to 40° C. followed by alkaline hydrolysis of the nitrile to form the carboxylic compound.

Another method involves contacting hydrogen cyanide gas, or gases containing hydrogen cyanide, with paraformaldehyde, or trimethyleneoxide $(CH_2O)_3$, in the presence of a small amount of water, with or without a small amount of an alkaline reacting material, thereby to produce glyconitrile.

Additionally, it is possible by adding potassium cyanide to cold water in the presence of sulfuric acid and formaldehyde to form glyconitrile.

It is apparent from these several different methods that the reaction of formaldehyde with a cyanide characteristically results in the formation of a nitrile. In general, although these reactions are easily carried out, the yields leave much to be desired and there is little to choose among them for a favored industrial process.

It is, accordingly, a fundamental object of this invention to provide a method of synthesizing glyconitrile by reaction of formaldehyde with hydrogen cyanide to produce substantially quantitative yields based on the cyanide.

Other objects and advantages of the invention will in part be obvious and in part appear hereinafter.

In accordance with my process, therefore, I prepare glyconitrile by direct reaction of hydrogen cyanide and formaldehyde, preferably in an aqueous medium at low temperature in a process in which I add formaldehyde or a formaldehyde yielding material, to the medium containing the cyanide, thereby having present a substantial excess of the cyanide. More particularly I provide a reactor to which I add water and liquid hydrogen cyanide; cool the reactor to a temperature preferably in the range from about 0° to 25° C. to maintain liquid phase, and, while stirring, I add, slowly, a stoichiometric amount of aqueous formaldehyde, for example, over a period of about two hours. Following completion of the addition of the formaldehyde, I continue agitation of the mixture to complete formation of the product, which, at the temperature level chosen, may take from 0.5 to 2 hours or more. Since hydrogen cyanide boils at 26° C., any temperature below that level is useful for operation and will permit maintaining liquid phase. With efficient reflux it is possible to operate at levels as high as 40-50° C. With a closed system, under pressure, operation in the liquid phase at temperatures as high as 100° C. is feasible.

The glyconitrile prepared in accordance with the process may be converted to ethylenediaminetetraacetic acid by direct reaction with ethylenediamine, as is described in the concurrently filed application of Arthur R. Sexton and Lee H. Horsley, Serial No. 637,358.

It is quite apparent that the reactor used in producing glyconitrile should preferably be part of a closed system, or that other safety precautions be observed, so that the very toxic hydrogen cyanide may be handled.

The process of the invention may be more fully understood by referring to the following specific example:

Example

Using an apparatus having a reactor equipped for the addition of fluid reactants and for the addition of reactants under the surface of liquid in a closed system, where a large quantity of hydrogen cyanide is to be handled, the reactor is charged with 500 parts of water which is then cooled to about 2° C. At this point 175 parts by weight (6.5 moles) of liquid hydrogen cyanide is added. The purpose of the cooling is to keep the hydrogen cyanide in the liquid phase. The temperature is kept as close to 0° as reasonably practicable while 527 parts by weight of 37 percent aqueous commercial formaldehyde solution is added slowly to the stirred reaction mixture. The rate of addition is kept such that the temperature can be conveniently maintained within the range from 2° to 10° C. One purpose of maintaining the reaction temperature low is to avoid loss of reactants by vaporization. With efficient reflux or a closed pressure system, liquid phase can be maintained and the reaction allowed to go as high as 100° C. With completion of the addition of the formaldehyde, stirring of the reaction mixture is continued and the reaction product of 1210 parts by weight is obtained. The product, aqueous solution, assays 30 percent, representing a yield of 365 parts by weight of glyconitrile, or 99 percent of the hydrogen cyanide used.

In the process, aqueous solution of paraformaldehyde may be used as the formaldehyde reactant.

Conversion of the glyconitrile to ethylenediaminetetraacetic acid, or to another carboxymethylated amine, is readily accomplished by direct reaction of the glyconitrile with the amine in the presence of alkali hydroxide.

Other typical amines easily reacted with the nitrile solution to form the corresponding acetic acid substitution product are: monohydroxyethylethylenediaminetriacetic acid; dihydroxyethylethylenediaminediacetic acid; diethylenertiamine, triethylenepentaamine, and monohydroxyethyl—and dihydroxyethyl—substitution products thereof.

The equation for the reaction applied to ethylenediamine is summarized as follows:

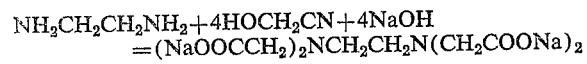

$NH_2CH_2CH_2NH_2 + 4HOCH_2CN + 4NaOH$
$= (NaOOCCH_2)_2NCH_2CH_2N(CH_2COONa)_2$

The equation may be generalized by using, in place of ethylene diamine, any amine having a primary or secondary hydrogen for reaction. Since this reaction is practically quantitative, the amount of product formed in a test sample can be used as an index of the amount of glyconitrile present in the reaction mixture.

It appears that the creation of a reaction medium characterized by the presence of a large amount of hydrogen cyanide, maintained at a low temperature is the most favorable one to have for the reaction involved in the preparation of the glyconitrile. Thus, in the following two experiments, the reaction media were aqueous formaldehyde and liquid hydrogen cyanide was added below the surface of the liquid.

*Experiment I.*—Using the manipulative technique described in the example, the reaction vessel was charged with 750 parts by weight of 37 percent HCHO (9.25 moles) and 565 parts by weight of water. The vessel was equipped with a stirrer, sparger for adding the HCN below the surface of the liquid, thermometer, and reflux condenser vented through a Dry Ice trap, and was cooled in an ice-water bath. The mixture was cooled to 2° C., 1.5 parts by weight of 5 N NaOH added and 250 parts by weight of anhydrous hydrogen cyanide bubbled in over a period of 2 hours at 2°–4° C. The mixture was stirred for 1 hour after adding the last of the HCN. The product weighed 1565 parts. A sample titrated with standard silver nitrate at 40°–50° C. in the presence of NaOH and a trace of KI, assayed 26.6 percent total (CN−) as glyconitrile. This represents 420 parts, 7.35 moles or 79.5 percent of the HCN used.

*Experiment II.*—Using the same technique as that described in Experiment I, 680 parts by weight of 37 percent HCHO and 510 parts by weight of water were added to a reaction vessel and cooled to 2° C. No catalyst was added in this run; 8.4 moles (227 parts) of anhydrous HCN were then passed in over a 2-hour period at 2°–10° C. The mixture was then stirred for 1 hour. The product weighed 1415 parts and a sample assayed 29.2 percent total (CN−) as glyconitrile. This represents 413 parts (7.25 moles) or 86 percent yield based on CN− passed.

Thus, it is apparent that the more favorable medium for preparation of glyconitrile is established in the reaction vessel by charging it with a substantial amount of hydrogen cyanide and thereafter adding the formaldehyde. The process in accordance with the example may be carried out on a continuous or a batch basis. For continuous operation it is merely necessary to adjust the rate of inflow of reactants to the rate of the reaction at the temperature being maintained.

Within the temperature range and pressure conditions for maintaining liquid phase, substantially quantitative yields based on the hydrogen cyanide can be expected. For speeding the reaction catalysts may be used. Alkaline materials are preferred and may consist of small amounts of hydroxides, cyanides and soluble carbonates of sodium, potassium, calcium, barium or magnesium. Although alkaline materials are preferred, acids in small amounts, such as hydrochloric, sulfuric, and phosphoric, may be used. Catalytic amounts of alkali or acid are all that is necessary, if they are to be used at all, such amounts being of the order of 0.004 mole of sodium hydroxide with 20 moles of formaldehyde.

Though the invention has been described with reference to only a limited number of examples, it is to be understood that variants thereof may be practiced without departing from its spirit or scope.

What is claimed is:

1. The method of preparing glyconitrile which comprises establishing an aqueous liquid reaction medium at a temperature below the boiling point of hydrogen cyanide at existing pressure, adding to said aqueous reaction medium a known quantity of liquid hydrogen cyanide, maintaining said reaction mixture in the liquid phase, progressively adding a formaldehyde yielding material to said reaction mixture in total amount substantially equivalent to that of the cyanide present and at a rate such that most of it is substantially immediately reacted with the cyanide present, thereby to form glyconitrile by reaction of formaldehyde and cyanide.

2. The method of making glyconitrile which comprises providing an aqueous reaction medium, cooling said reaction medium while keeping said reaction medium in the liquid state, adding a known quantity of liquid hydrogen cyanide, to form a solution of said water and hydrogen cyanide, slowly adding formaldehyde at a rate such that most of it reacts substantially immediately, thereby to form a solution of glyconitrile.

3. The method in accordance with claim 2 in which the temperature of the reaction medium is kept at a level below about 100° C.

4. The method in accordance with claim 2 in which the temperature is kept below about 10° C.

References Cited in the file of this patent

UNITED STATES PATENTS

| | | |
|---|---|---|
| 1,984,415 | Macallum | Dec. 18, 1934 |
| 2,101,823 | Dittmar | Dec. 7, 1937 |
| 2,748,154 | Journeay | May 29, 1956 |
| 2,752,383 | Belt | June 26, 1956 |